3,102,902
STABLE MIXED CYCLIC BORATE ESTERS OF GLYCOLS AND HINDERED PHENOLS
Robert M. Washburn, Whittier, and Charles F. Albright, West Covina, Calif., assignors to American Potash & Chemical Corporation, a corporation of Delaware
No Drawing. Original application Oct. 13, 1958, Ser. No. 766,684. Divided and this application Feb. 28, 1961, Ser. No. 99,659
8 Claims. (Cl. 260—462)

This invention relates in general to the novel preparation of compositions of matter and more particularly to the preparation of stable mixed cyclic borate esters of glycols and hindered phenols. This application is a division of application Serial No. 766,684, filed October 13, 1958.

Compounds such as DBPC (for di-tert.-butyl-p-cresol; correct nomenclature 2,6-di-tert.-butyl-4-methylphenol) are recognized as effective antioxidants for hydrocarbon materials such as petroleum and rubber. Borate esters are also used as additives for various petroleum products. As petroleum additives, they may serve to inhibit corrosion, prevent wax precipitation, act as dehydrating agents and demulsifiers and generally improve gasoline performance.

It is advantageous to have available for use as an additive for petroleum products a material which combines the desirable features of both the boron-containing compounds and the antioxidant properties of such materials as DBPC, but which, at the same time, is thermally and hydrolytically stable.

It is therefore an object of this invention to prepare a material which is a thermally and hydrolytically stable additive for petroleum combining the desirable features found in boron-containing compounds with the properties of such antioxidants as DBPC.

Further objects and advantages of this invention, if not specifically set forth, will become apparent during the course of the description which follows.

Broadly, it has been found that stable cyclic, mixed borate esters of glycols and hindered phenols may be prepared by reacting certain mixed borate esters of phenol with a glycol. These products have the general formula:

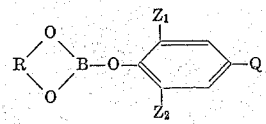

where R is a polymethylene chain of two to five carbon atoms in length, one or more hydrogens of which may be replaced with a lower alkyl substituent, Q is hydrogen, halogen, nitro, amino and lower alkyl-substituted amino, acetylamino or alkyl and $Z_1$ and $Z_2$ are tertiary alkyl groups.

Any glycol may be used which has between two and five methylene groups separating the hydroxy groups. Hence, R in the general formulae denotes an aliphatic group which may be a simple polymethylene group of 2–5 carbons or may be a branched chain group having no more than 5 carbons bridging the hydroxy groups.

The mixed borate ester of the phenol is of the type

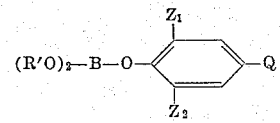

where Q may be H, F, Cl, Br, I, $NO_2$, $NH_2$, $CH_3$, $t\text{-}C_4H_9$, etc., where R' is an alkyl group or any aliphatic group of 1–10 carbon atoms, e.g., Me-, Et-, i-Pr-, n-Pr-, n-Bu-, i-Bu, sec.-Bu-, Am-, isoAm-, and the like, and $Z_1$ and $Z_2$ are tertiary alkyl groups (t-$C_4H_9$, t-$C_5H_{11}$) bonded to the aromatic ring. As examples, the glycols may be 2,2-dimethylpropanediol-1,3 or 2-methylpentanediol-2,4 or propylene glycol.

Various examples of this invention are set forth below for illustrative purposes and are not to be deemed as imposing limitations on the scope of the invention other than as set forth in the appended claims.

EXAMPLE I.—PREPARATION OF 2,6-DI-TERT.-BUTYL - 4 - METHYLPHENYL - 2,2 - DIMETHYLPROPANEDIOL-1,3 BORATE (DBPC-NPGB)

Neopentyl glycol (2,2-dimethylpropanediol-1,3, 104 g., 1.0 mole) and DBPC-DIB (2,6-di-tert.-butyl-4-methylphenyldiisopropyl borate, 348 g., 1.0 mole) were dissolved in anisole (225 ml.) and slowly distilled. Isopropanol was removed. After most of the isopropanol had been removed, dodecane (100 ml.) was added to limit the pot temperature and distillation continued. Upon completion of the reaction, the anisole and dodecane were removed in vacuo.

The desired reaction product was recovered as a colorless viscous syrup by distillation in vacuo (137–141° C., 0.6 mm.). The syrup crystallized slowly after standing several days.

Analysis.—Calcd. for $C_{20}H_{33}O_3B$: B, 3.26%; C, 72.30%; H, 10.10%. Found: B, 3.42%; C, 70.70%; H, 9.50%.

EXAMPLE II.—PREPARATION OF 2,6-DI-TERT.-BUTYL-4-METHYLPHENYL-ETHYLENE GLYCOL BORATE (DBPC-EGB)

2,6-di-tert. - butyl - 4 - methylphenyl-diisopropyl borate (DBPC-DIB, 348 g., 1.0 mole) and ethylene glycol (62.1 g., 1.88 moles) were heated in a distillation apparatus for 15 hours at 100 mm. Isopropyl alcohol (210 ml.) was slowly removed as distillate. The residue, 2,6-di-tert.-butyl-4-methylphenyl-ethylene glycol borate (DBPC-EGB) was a viscous heavy oil which was soluble in methanol, ethanol, benzene, petroleum ether (B.P. 60° C.), ether, and carbon tetrachloride.

A wide variety of glycols may be used, as set forth above. These are shown in greater detail in the following tables showing the stoichiometry for various other runs:

Table I
REACTION OF MIXED BORATE ESTER AND GLYCOL

| Example No. | Glycol | Phenol | | | Cyclic mixed borate ester product |
|---|---|---|---|---|---|
| | | Q | Z | R' | |
| III | ethylene glycol | $C_5H_{11}$ | t-butyl | $C_8H_{17}$ | |
| IV | do | I | 3-ethyl-pentyl | $C_2H_5$ | |
| V | 1,2-dihydroxybutane | $O_2N$ | t-butyl | t-$C_4H_9$ | |
| VI | 1,4-dihydroxy-2,3-dimethylbutane | t-$C_4H_9$ | t-butyl | $CH_3$ | |
| VII | 2,3-dihydroxyhexane | H | t-butyl | $CH_3$ | |

As set forth earlier, the compounds prepared according to the present invention are useful as additives in petroleum products and may be added to greases, oils, gasoline or kerosene, serving as effective and stable antioxidants. The stability of these compounds is contributed, in part, by the hindered phenol.

These compounds are of particular value because of their unusual stability. They are far more stable than most closely related compounds known heretofore, e.g., the mixed esters derived from phenol, boric oxide and ethylene glycol disclosed by Thomas in J. Chem. Soc., 1946, 823.

The processes described above for the preparation of these esters involve various novel steps and reactions unusual for such ordinarily non-reactive materials as these sterically hindered phenols.

Obviously, many modifications and variations may be made without departing from the spirit and scope of this invention and therefore only such limitations should be imposed as are indicated in the appended claims.

We claim:

1. A process for preparing a compound of the general formula:

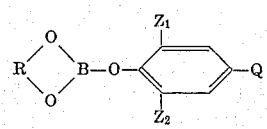

where R is selected from the group consisting of a polymethylene radical having between 2 and 5 carbon atoms in a linear chain and a polymethylene group having between 2 and 5 carbon atoms in a linear chain, at least one hydrogen thereof being lower alkyl-substituted, Q is selected from the class consisting of hydrogen, halogen, nitro, amino, lower alkyl-substituted amino, acetylamino and alkyl, and $Z_1$ and $Z_2$ are tertiary alkyl groups comprising: reacting a mixed borate ester of a phenol having the general formula:

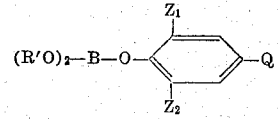

where Q, $Z_1$ and $Z_2$ are as defined earlier and where R' is an alkyl group with a glycol whereby to produce said borate ester.

2. A process for preparing 2,6-ditertbutyl-4-methylphenyl-2,2-dimethylpropanediol-1,3 - borate comprising: reacting 2,6-diterbutyl-4-methylphenyl-diisopropyl borate with neopentyl glycol, whereby to produce said borate ester.

3. A process for preparing a compound of the general formula

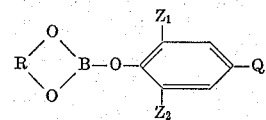

where R is selected from the group consisting of a polymethylene radical having between two and five carbon atoms in a linear chain and a polymethylene group having between two and five carbon atoms in a linear chain, at least one hydrogen thereof being lower alkyl-substituted, Q is selected from the class consisting of hydrogen, halogen, nitro, amino, lower alkyl-substituted amino, acetylamino and alkyl, and $Z_1$ and $Z_2$ are tertiary alkyl groups comprising: reacting a mixed borate ester of a phenol having the general formula

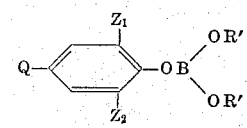

wherein Q, $Z_1$ and $Z_2$ are as defined earlier and wherein R' is an alkyl group of one to ten carbons, with a glycol of the general formula $R(OH)_2$, wherein R is as defined earlier, whereby to produce said borate ester.

4. A process for preparing a compound of the general formula:

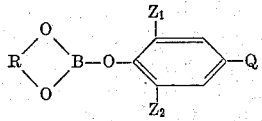

where R is selected from the group consisting of a polymethylene radical having between 2 and 5 carbon atoms in a linear chain and a polymethylene group having between 2 and 5 carbon atoms in a linear chain, at least one hydrogen thereof being lower alkyl-substituted, Q is selected from the class consisting of hydrogen, halogen, nitro, amino, lower alkyl-substituted amino, acetylamino and alkyl, and $Z_1$ and $Z_2$ are tertiary butyl groups comprising: reacting a mixed borate ester of a phenol having the general formula:

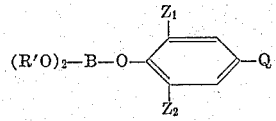

where Q, $Z_1$ and $Z_2$ are defined earlier and where R' is an alkyl group, with a glycol, whereby to produce said borate ester.

5. A process for preparing a compound of the general formula:

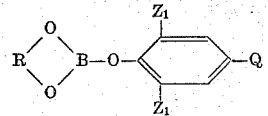

where R is selected from the group consisting of a polymethylene radical having between 2 and 5 carbon atoms in a linear chain and a polymethylene group having between 2 and 5 carbon atoms in a linear chain, at least one hydrogen thereof being lower alkyl-substituted, Q is methyl, comprising: reacting a mixed borate ester of a phenol having the general formula:

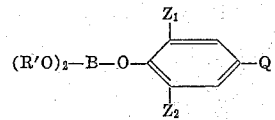

where Q, $Z_1$ and $Z_2$ are as defined earlier and where R' is an alkyl group, whereby to produce said borate ester.

6. A process for preparing 2,6-ditertbutyl-4-methylphenylethylene glycol borate comprising: reacting 2,6-ditertbutyl-4-methylphenyl-diisopropyl borate, with ethylene glycol, whereby to produce said borate ester.

7. A process for preparing a compound of the general formula:

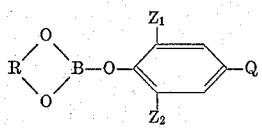

where R is selected from the group consisting of a polymethylene radical having between 2 and 5 carbon atoms in a linear chain and a polymethylene group having between 2 and 5 carbon atoms in a linear chain, at least one hydrogen thereof being lower alkyl-substituted, Q is selected from the class consisting of hydrogen, halogen, nitro, amino, lower alkyl-substituted amino, acetylamino and alkyl, and $Z_1$ and $Z_2$ are tertiary butyl groups comprising: reacting a mixed borate ester of a phenol having the general formula:

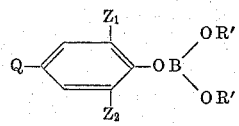

wherein Q, $Z_1$ and $Z_2$ are as defined earlier and wherein R' is an alkyl group of 1 to 10 carbons, with a glycol of the general formula $R(OH)_2$, wherein R is as defined earlier, whereby to produce said borate ester.

8. A process for preparing a compound of the general formula:

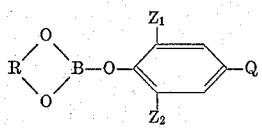

where R is selected from the group consisting of a polymethylene radical having between 2 and 5 carbon atoms in a linear chain and a polymethylene group having between 2 and 5 carbon atoms in a linear chain, at least one hydrogen thereof being lower alkyl-substituted, Q is methyl, comprising: reacting a mixed borate ester of a phenol having the general formula:

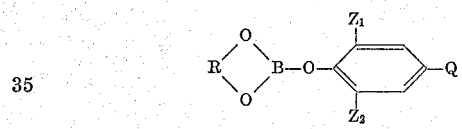

wherein Q, $Z_1$ and $Z_2$ are as defined earlier and wherein R' is an alkyl group of 1 to 10 carbons, with a glycol of the general formula $R(OH)_2$, wherein R is as defined earlier, whereby to produce said borate ester.

No references cited.